United States Patent
Egendorf (10) Patent No.: US 11,786,805 B1
(45) Date of Patent: Oct. 17, 2023

(54) METHOD AND APPARATUS FOR PLAYING A WORD GAME

(71) Applicant: Symbolics Inc., Lincoln, MA (US)

(72) Inventor: Andrew Egendorf, Lincoln, MA (US)

(73) Assignee: Symbolics Inc., Lincoln, MA (US)

( * ) Notice: Subject to any disclaimer, the term of this patent is extended or adjusted under 35 U.S.C. 154(b) by 0 days.

(21) Appl. No.: 18/136,690

(22) Filed: Apr. 19, 2023

(51) Int. Cl.
*A63F 3/04* (2006.01)
*A63F 13/2145* (2014.01)

(52) U.S. Cl.
CPC ........ *A63F 3/0421* (2013.01); *A63F 13/2145* (2014.09)

(58) Field of Classification Search
CPC ........................... A63F 3/0421; A63F 13/2145
USPC ............................................................ 463/9
See application file for complete search history.

(56) References Cited

U.S. PATENT DOCUMENTS

| | | | |
|---|---|---|---|
| 2008/0064460 A1* | 3/2008 | Daniel ................ | A63F 3/0421 463/11 |
| 2009/0160130 A1* | 6/2009 | Le Cottier ............ | A63F 9/183 273/272 |
| 2015/0190708 A1* | 7/2015 | Hoyt .................. | G07F 17/3295 273/272 |
| 2015/0251085 A1* | 9/2015 | Banker ................ | A63F 9/0098 463/9 |
| 2020/0174655 A1* | 6/2020 | Murphy .............. | G06F 3/04883 |

OTHER PUBLICATIONS

"How to Play Eldrow, a Reverse Wordle game?", dated Mar. 18, 2022, https://nerdschalk.com/how-to-play-eldrow-a-reverse-wordle-game/ (Year: 2022).*
"Absurdle by qntm", dated Jan. 10, 2022, https://qntm.org/files/absurdle/absurdle.html (Year: 2022).*
"Absurdle", dated Jan. 10, 2022, https://qntm.org/absurdle (Year: 2022).*
"How to Download Wordle and Play Offline for the Next 5 Years", Author: Nelson Aguilar, dated May 11, 2022, https://www.cnet.com/culture/how-to-download-wordle-and-play-offline-for-the-next-5-years/ (Year: 2022).*
"Adverswordle Is a Backwards Version of Wordle and It's Delightfully Challenging", Author: Tim Sweezy, dated Mar. 21, 2022, https://hothardware.com/news/adverswordle-is-a-backwards-version-of-wordle (Year: 2022).*

* cited by examiner

*Primary Examiner* — Allen Chan
(74) *Attorney, Agent, or Firm* — Norris McLaughlin, P.A.

(57) ABSTRACT

A method and apparatus for playing a word game with two players, wherein a programmed processor allows:
a. a first player to select a secret word of a predetermined length by choosing a word from among the words in a predetermined dictionary, the secret word to be guessed by the second player within a predetermined number of guesses;
b. the second player to make a guess of the secret word;
c. the first player to indicate to the second player the letters in the guessed word that are in the secret word;
d. to repeat steps b. and c. until the secret word is guessed or the predetermined number of guesses have been made; and
e. wherein the first player is a human, and the second player is a computer.

30 Claims, 11 Drawing Sheets

METHOD AND APPARATUS FOR PLAYING A WORD GAME

BACKGROUND

The present invention relates to a word game and a method and apparatus for playing the word game. The applicant calls this word game EGENDU™.

Wordle™ is a web-based word game created and developed by a software engineer and which was purchased by the New York Times in 2022. In Wordle, players have six attempts to guess a five-letter word, with feedback given for each guess in the form of colored tiles indicating when letters match or occupy the correct position.

The New York Times Wordle has a single daily solution, with all players attempting to guess the same word. The five-letter word is selected from a Wordle dictionary maintained by the New York Times. Each daily game uses a word from a randomly ordered list of about 2,500 words (of the approximately 13,000 five-letter words in the English language). After every guess, each letter is marked as either green, yellow or gray: green indicates that letter is correct and in the correct position, yellow means it is in the answer but not in the right position, while gray indicates it is not in the answer at all. Multiple instances of the same letter in a guess, such as the "c's" in "crack", will be colored green or yellow only if the letter also appears multiple times in the answer; otherwise, excess repeating letters will be colored gray. The game has a "hard mode" option, which requires players to include letters marked as green and yellow in subsequent guesses.

A number of variations of Wordle also have been developed. Absurdle, created by a British programmer, is an adversarial version of Wordle where the target word changes with each guess, while still staying true to previously revealed hints. See https://www.theguardian.com/us-news/2022/jan/13/absurdle-machiavellian-version-of-wordle

SUMMARY

The original Wordle game and its variations all involve a web-based server to select a word and challenge a human opponent. In accordance with the improvement of the present invention, the EGENDU word game reverses the competition by having the human select the word to be guessed by the computer. In some embodiments of the invention, the human can change the word to be guessed by the computer after one or more of the computer's guesses.

In some embodiments of the invention, the dictionary comprises the words in at least one of the Merriam-Webster online dictionary, the Oxford English dictionary, the Scrabble® dictionary, the Wordle dictionary, and a purpose-built dictionary.

In some embodiments of the invention, any predetermined length of the word to be guessed may be used.

In some embodiments of the invention, any predetermined number of guesses may be used.

In some embodiments of the invention, the level of difficulty of guessing the word to be guessed by the computer may be set before the game commences to a level of difficulty across a spectrum from easier to more difficult. An example of the easy end of the spectrum is that any word may be guessed for any of the computer's guesses. An example of the difficult end of the spectrum is that every guess must be a possible answer. Other examples along the spectrum of difficulty include: (1) every letter identified as being in the correct location must be used in that location in all subsequent guesses; (2) in addition to (1), every letter identified as being in the wrong location must be used in all subsequent guesses; and, (3) in addition to (2), no letter identified as being in the wrong location may be used in that same wrong location in a subsequent guess.

In some embodiments of the invention, the level of the guessing ability utilized by the computer may be set before the game commences to a level of ability across a spectrum from less ability to more ability. An example of the less ability end of the spectrum is that every guess is randomly chosen from the dictionary, taking into account the information previously obtained from the human player in the current game. Examples of the more ability end of the spectrum is that every guess takes into account information about the human player gained from previous games, e.g., (1) that the human player tends to choose words with double or triple letters; (2) that the human player tends choose words beginning with two consonants; and, (3) that the human player favors or avoids certain vowels.

Before commencement of the playing of a game, the human player selects the predetermined dictionary, the predetermined length of the word, the predetermined number of guesses, whether or not the human player may change the word to be guessed by the computer after one or more of the computer's guesses, the computer player's level of guessing difficulty, and the computer player's level of guessing ability. These selections may be done, for example, by the human player entering numeric or other codes to which the computer responds by requesting the predetermined dictionary and other inputs.

In some embodiments of the invention the computer can use data collected from previously played games to improve its guessing skill using machine learning and/or artificial intelligence (AI). In some embodiments, the human players also can collect data from previous games and use computers having machine learning and/or AI capabilities to suggest words that would provide the greatest challenge to the computer opponent.

Similarly, the human player can alter a purpose-built dictionary by adding or deleting words by the human player entering numeric or other codes to which the computer responds by requesting the alteration of the dictionary including the adding and/or deleting of words.

In some embodiments, the communications between the human and the computer is over the Internet wherein the computer is a web-based server or the like. In other embodiments, the communications between the human and the computer is not over the internet. In such a case the game is played on a mobile device such as a smartphone or tablet or purpose-built device where the entirety of the game software is locally stored on the smartphone, tablet, or device. Alternatively, updates to the program on the smartphone, tablet, or device can be made from time to time over a connection to the Internet or by direct connection to a data storage device such as a USB memory stick.

In the method and apparatus, the apparatus can be any device that displays information or is used for entertainment and is preferably a smartphone such as an iPhone or an Android phone, a smart watch such as an Apple Watch, a tablet such as an iPad or an Android tablet, a laptop computer such as a Mac, a Windows computer or a Chromebook, an e-reader such as a Kindle, a Nook, a PDA, a gaming device such as a Nintendo gaming device such as the Switch, an Xbox, or a Sony PlayStation, a television, or a purpose-built device.

These and other embodiments of the invention are achieved in accordance with the invention by a method for playing a word game with two players, comprising the steps of:

a. a first player selecting a secret word of a predetermined length by choosing a word from among the words in a predetermined dictionary, the secret word to be guessed by the second player within a predetermined number of guesses,
b. the second player making a guess of the secret word,
c. the first player indicating to the second player the letters in the guessed word that are in the secret word,
d. repeating steps b. and c. until the secret word is guessed or the predetermined number of guesses have been made, and
e. wherein the first player is a human, and the second player is a computer.

In other embodiments, the step of indicating in step c. further comprises indicating to the second player the letters in the guessed word that are in the same position as are those letters in the secret word and the letters in the guessed word that are not in the same position as are those letters in the secret word.

In some embodiments, the first player optionally changes the secret word after a guess to a changed secret word, wherein the changed secret word is in the predetermined dictionary and wherein the indications previously given in step c. remain correct, and wherein the secret word to be guessed in step d. by the second player comprises a last changed secret word.

In some embodiments, the first player optionally changes the secret word after any guess and before the next guess.

In some embodiments, the predetermined length comprises 5 letters, the predetermined dictionary comprises the Wordle™ dictionary and the predetermined number of guesses is 6.

These and other embodiments of the invention are also achieved in accordance with the invention by an apparatus for playing a word game with two players, comprising a programmed processor configured to carry out the following:

a. receiving from a first player a selected secret word of a predetermined length by chosen from among the words in a predetermined dictionary, the secret word to be guessed by the second player within a predetermined number of guesses,
b. receiving a guess from the second player of the secret word,
c. indicating to the to the second player the letters in the guessed word that are in the secret word,
d. repeating steps b. and c. until the secret word is guessed or the predetermined number of guesses have been made, and
e. wherein the first player is a human, and the second player is a computer.

In other embodiments, the indicating in step c. further comprises indicating to the second player the letters in the guessed word that are in the same position as are those letters in the secret word and the letters in the guessed word that are not in the same position as are those letters in the secret word.

In some embodiments, the processor allows the first player to optionally change the secret word after a guess to a changed secret word, wherein the changed secret word is in the predetermined dictionary and wherein the indications previously given in step c. remain correct, and wherein the secret word to be guessed in step d. by the second player comprises a last changed secret word.

In some embodiments, the processor allows the first player to optionally change the secret word after any guess and before the next guess.

In some embodiments, the predetermined length comprises 5 letters, the predetermined dictionary comprises the Wordle™ dictionary and the predetermined number of guesses is 6.

These and other embodiments of the invention are disclosed in detail with the respect to the attached drawings wherein:

DETAILED DESCRIPTION

Figure 1:
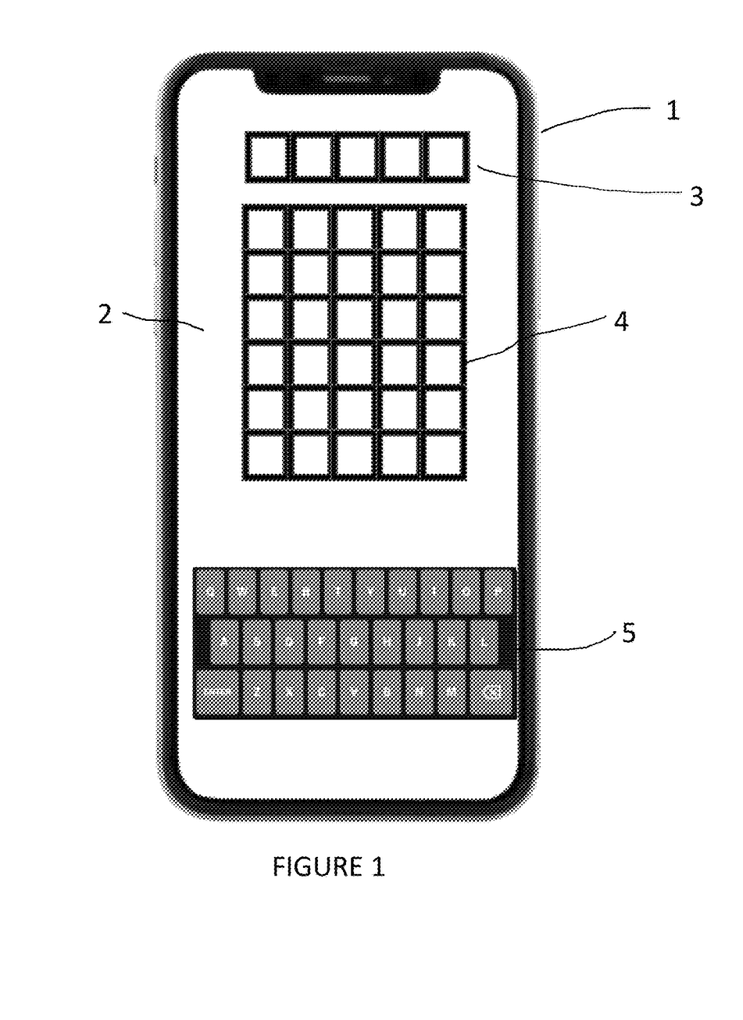
FIG. 1 is a front view of a smartphone displaying one embodiment of the game according to the method and apparatus of the present invention.
Figure 2:
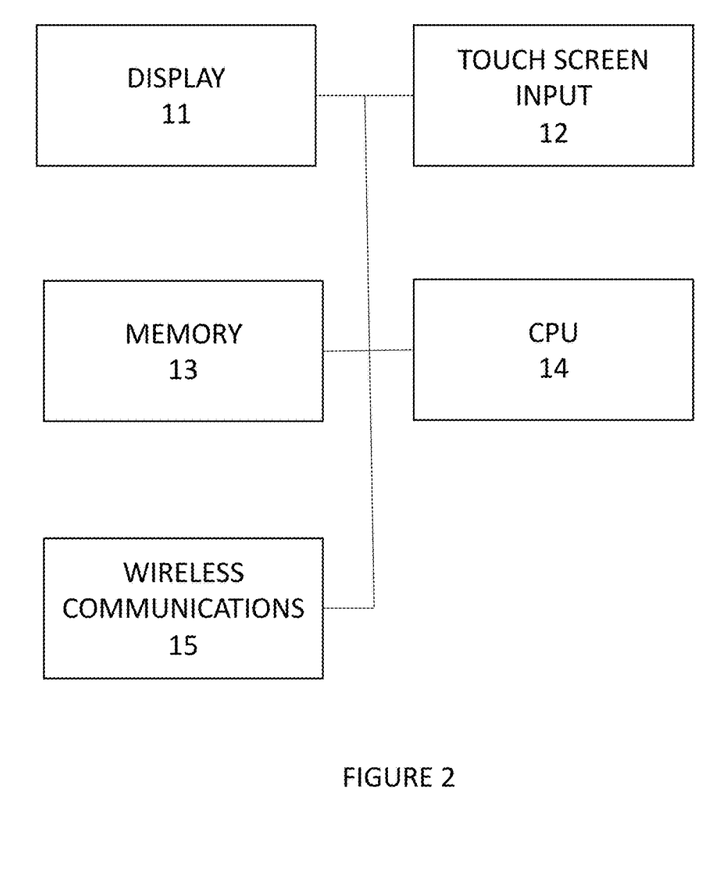
FIG. 2 is a block diagram of one embodiment of the apparatus for carrying out embodiments of the method of the present invention.

Referring now to FIGS. 1 and 2, an apparatus for carrying out the method for playing embodiments of the word game according to the present invention is described. The Figures describe a version of the game in which the predetermined length of the word to be guessed is 5 letters, and the predetermined number of guesses is 6. The apparatus, which can be in the form of a smartphone such as the IOS-based Apple iPhone 14 or the Android-based Samson S23 Galaxy phone or the like, in the form of a tablet such as the Apple iPad or Samson Galaxy tablet, or a purpose-built device that includes a programmed processor so that the game is self-contained or includes a processor that communicates with a web-based server over the Internet to play the game.

The apparatus includes the processor which is a microcontroller or microprocessor and forms the central processing unit or CPU 14 which is connected via a bus to memory 13, a display 11 which has a touch screen input 12 and which has wireless communications 15 such as Bluetooth, Wi-fi or other standard wireless protocols for communicating with the Internet or other devices.

The display 11 is shown as the display screen 2 of smartphone 1 which is programmed via an app on the device to provide a screen in the form shown that has a space 3 for the secret word to be guessed, a space 4 for the guesses by the computer and a space 5 in the form of a keyboard for receiving the secret word to be guessed as well as the changes to the secret word as will be described later.

An example of an embodiment of the game according to the invention wherein the computer wins is shown in FIGS. 3A-3E which depicts spaces 3 and 4 as they are filled in during the game.

Figure 3A:
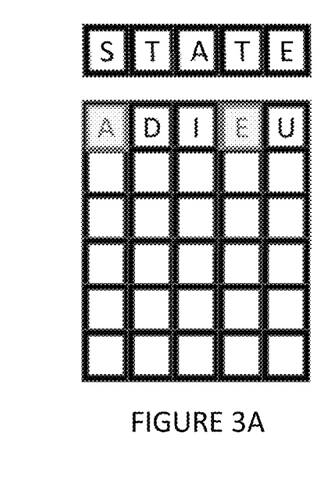
FIGS. 3A-3E show the display of one embodiment of the game of the present invention.

As shown in FIG. 3A, the secret word entered by the human player is "STATE". The computer makes the first guess as "ADIEU". Since the "A" and "E" are in the secret word but in the incorrect positions, the "A" and "E" are highlighted in yellow. The other letters are in gray. In addition, the letters in the keyboard 5 are similarly colored like those in the guesses.

Figure 3B:
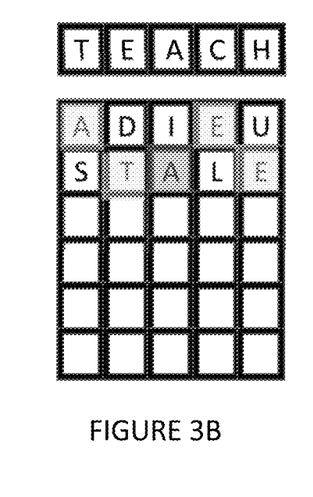

In FIG. 3B, before the computer is permitted to make its second guess, the human player has the option of changing the secret word, which the human player has done and the new secret word is "TEACH". The only limitations on the selection of the new secret word are: (1) that the new word is in the predetermined dictionary; and, (2) that the letters therein are consistent with those in the previous secret word: the "A" and "E" are in the wrong position and there is no "D", "I" or "U". To check if the selection of the new secret word is in the predetermined dictionary, the human player can, for example, enter a numeric or other code to which the computer then asks for the new secret word and replies whether or not it is in the predetermined dictionary. As can be seen, the human player selects "TEACH" as the new secret word. The computer guesses "STALE" as the second guess and the "A" is highlighted in green since it is in the correct position, but the "E" and "T" are highlighted in yellow because they are in the wrong positions.

Figure 3C:
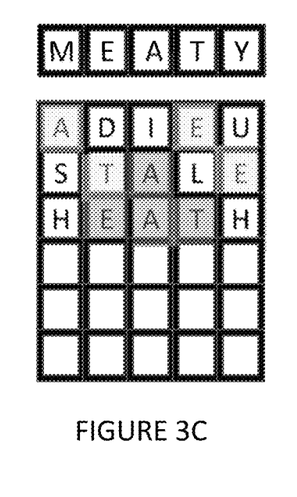

Before the third guess in FIG. 3C, the human player switches the secret word to "MEATY" and the computer guesses "HEATH". Since the "EAT" is in the correct position, they are highlighted in green whereas the "H"'s are in gray.

Figure 3D:
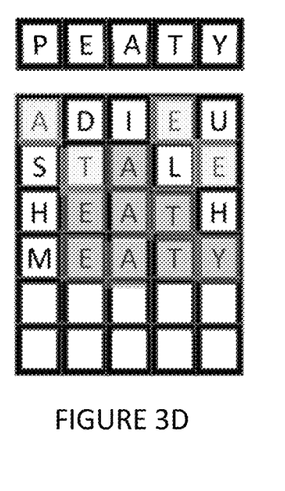

Before the fourth guess by the computer, the human player changes the secret word again to "PEATY" as shown in FIG. 3D. The computer makes its fourth guess of "MEATY" of which "EATY" is in the proper position and highlighted in green.

Figure 3E:
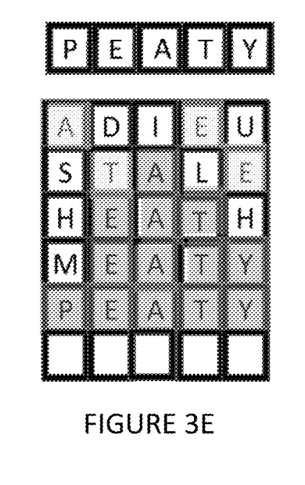

The computer makes its fifth guess in FIG. 3E, the human player opting not to change the secret word. The computer guesses, "PEATY" and since all of the letters are in the correct position, they are all highlighted in green and the computer wins. In some embodiments there is an indication of the computer winning by flashing text or colors, sounds such as music, tones, a buzzer or a bell, a haptic notification such as a vibration, etc., or a combination of any of the foregoing, perhaps including confetti flying across the screen.

FIGS. 4A-4G illustrate an embodiment of a game according to the present invention wherein the human wins.

Figure 4A:
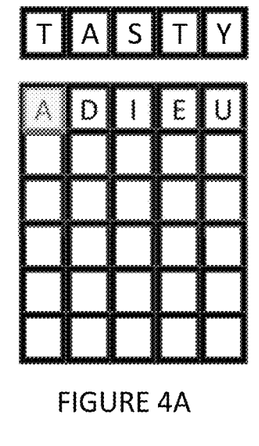
FIGS. 4A-4G show the display of another embodiment of the game of the present invention.

In FIG. 4A, the secret word is entered as "TASTY" and the first guess by the computer is "ADIEU". The "A" is indicted as being in the wrong position.

Figure 4B:
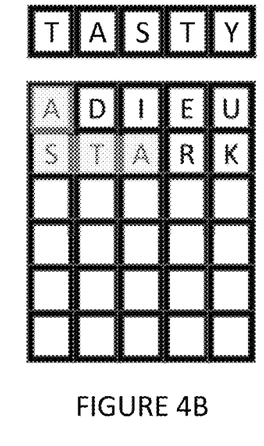
Figure 4C:
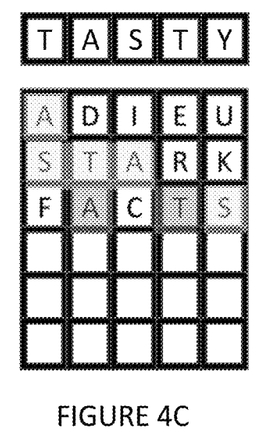

In FIG. 4B, the human player opts to not change the secret word and the computer makes a second guess of "STARK". Here, the "S", "T" and "A" are indicated as being in the wrong position.

In FIG. 4C, the human player again opts to not change the secret word and the computer makes a third guess of "FACTS". Here, the "A" and "T" are indicated as being in the proper position and the "S" is indicated as being in the incorrect position.

Figure 4D:
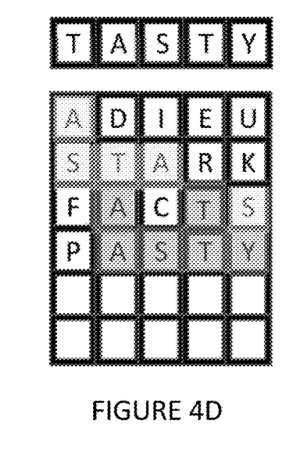
Figure 4E:
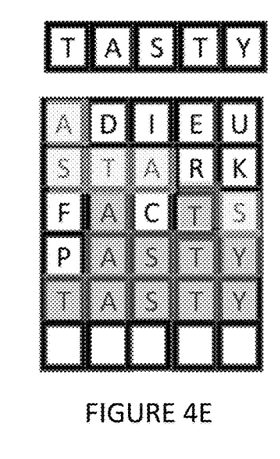

In FIG. 4D, the human player yet again opts to not change the secret word and the computer makes a fourth guess of "PASTY". Here the "ASTY" is in the proper position and highlighted in green.

In FIG. 4E, the human player again opts not to change the secret word and the computer makes a fifth guess of "TASTY". All of the letters are correct, but the human player has the option of changing the secret word and does so in FIG. 4F wherein the secret word is now "HASTY".

Figure 4F:
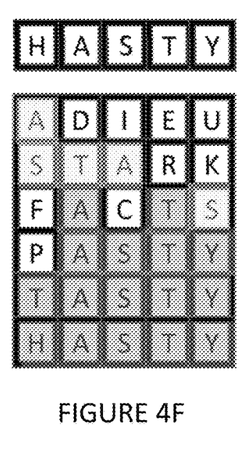
Figure 4G:
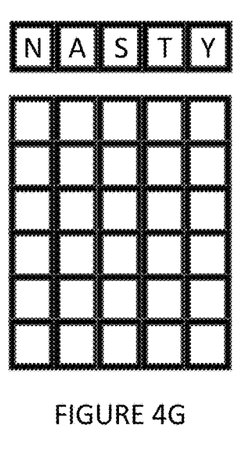

In FIG. 4F, the computer is able to make a sixth guess of "HASTY", but the human player still has the option of changing the secret word, which the human player does in FIG. 4G, changing it to "NASTY". Since the computer has made its six guesses, the computer loses.

FIGS. 5A-5F illustrate a flowchart of an algorithm for playing embodiments of the game and which can be used to program a processor to carry out the method and form a part of the apparatus according to the present invention.

Figure 5A:
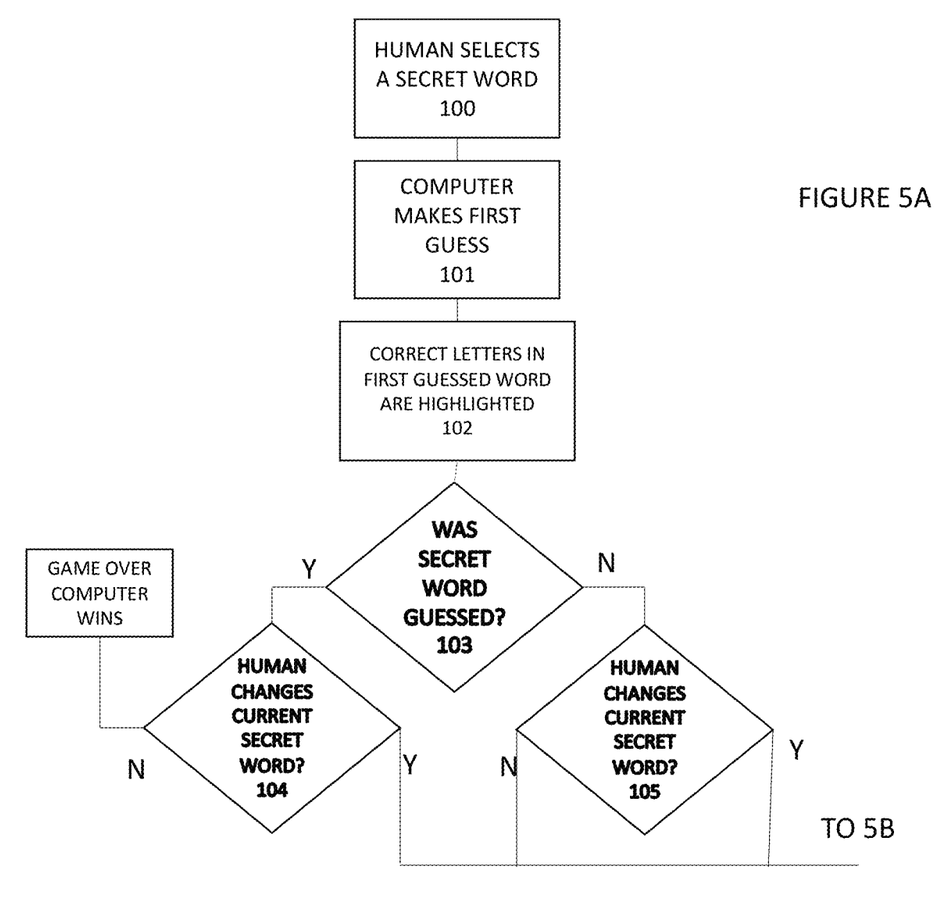
FIGS. 5A-5F are flowcharts of some embodiments of the method of the game according to the present invention.

In FIG. 5A, the human player selects a secret word in step 100. Thereafter the computer makes the first guess in step 101. The correct letters in the first guessed word are highlighted in step 102, for example, letters in the correct position are in green whereas letters in the incorre4ct position are in yellow. Other colors also can be used to distinguish correct and incorrect letters and positions. The next step is the yes or no decision step 103, "was the secret word guessed?". If no, then the human player has the option of changing the secret word in step 105 or not and the game continues at FIG. 5B. If yes, then the human player has the option of changing the secret word in step 104 or not. If yes, then the game continues in FIG. 5B. If not, then the computer wins and the game is over.

Figure 5B:
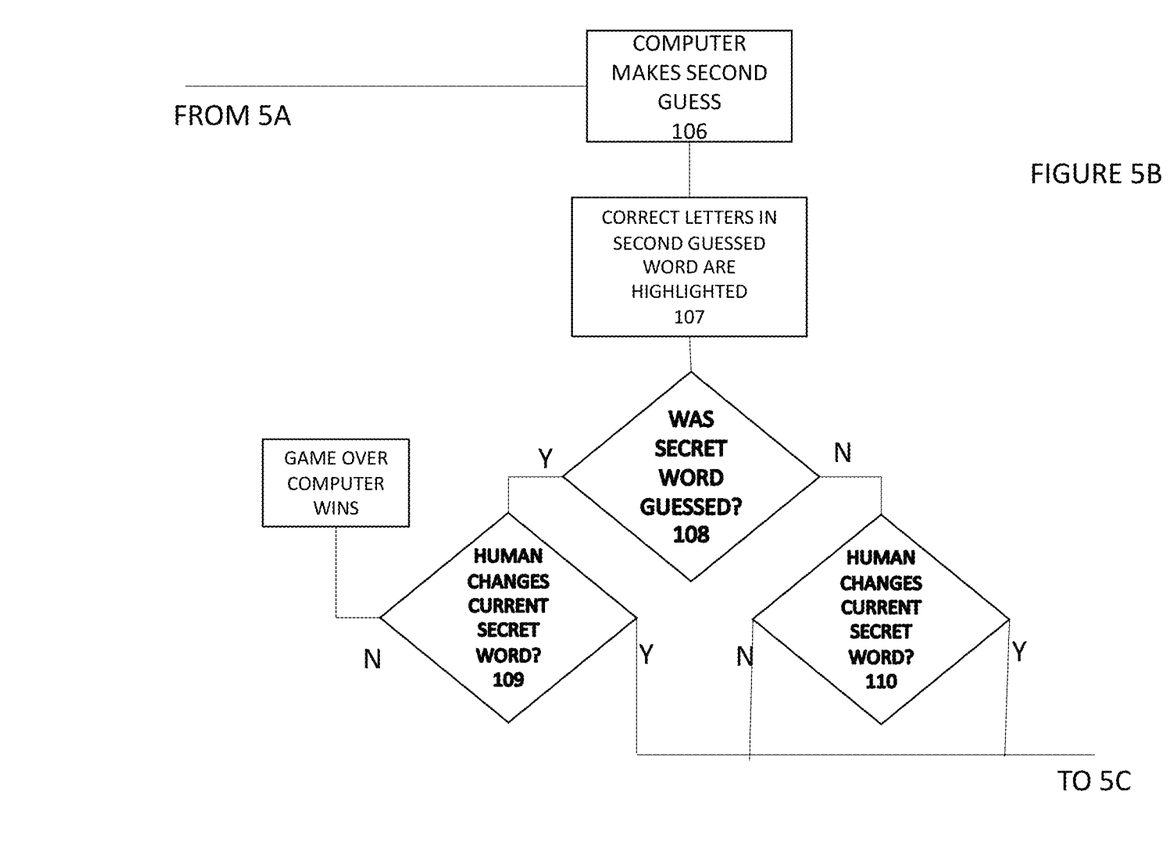

In FIG. 5B, assuming that the computer has not won and the game continues, the computer now makes its second guess in step 106. The correct letters in the second guessed word are highlighted in step 107. The next step is the yes or no decision step 108, "was the secret word guessed?". If no, then the human player has the option of changing the secret word in step 110 or not and the game continues at FIG. 5C. If yes, then the human player has the option of changing the secret word in step 109 or not. If yes, then the game continues in FIG. 5C. If not, then the computer wins and the game is over.

Figure 5C:
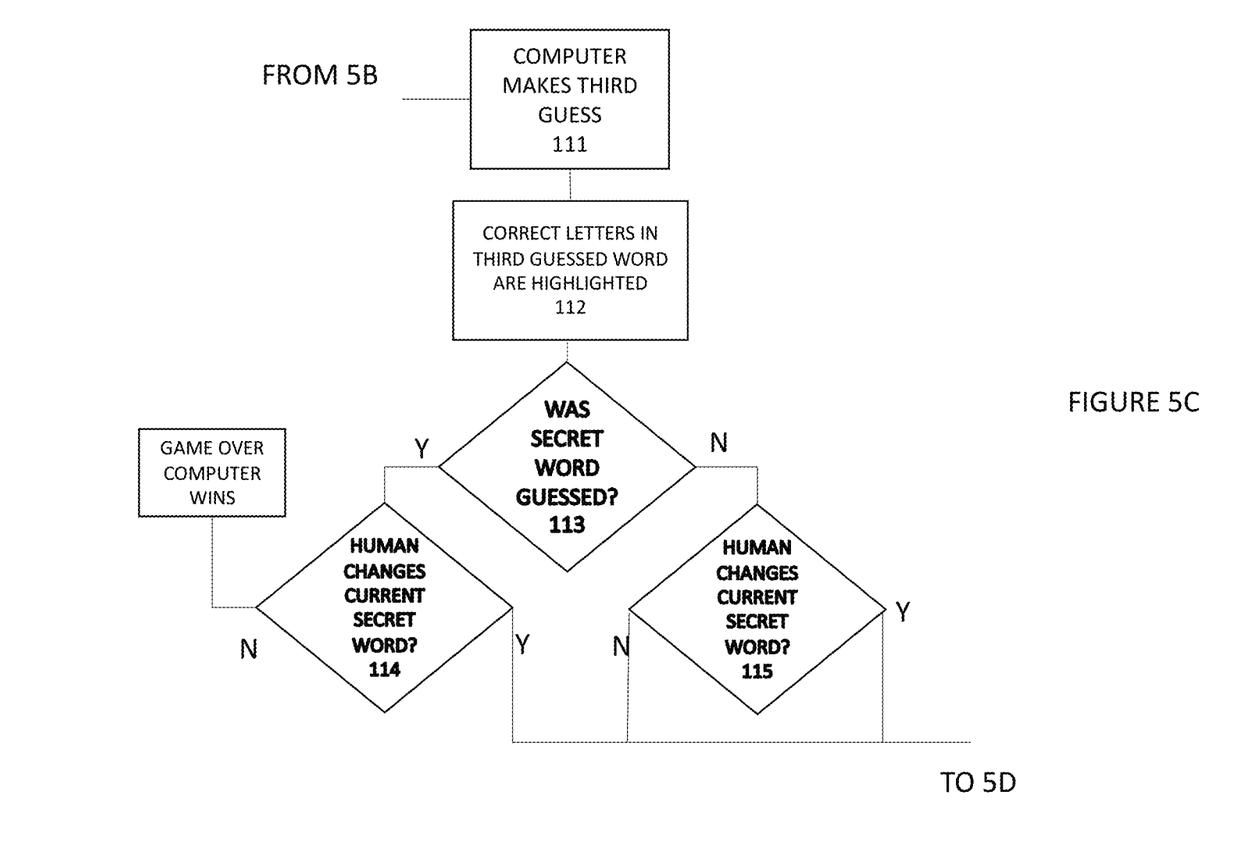

In FIG. 5C, assuming that the computer has not won and the game continues, the computer now makes its third guess in step 111. The correct letters in the third guessed word are highlighted in step 112. The next step is the yes or no decision step 113, "was the secret word guessed?". If no, then the human player has the option of changing the secret word in step 115 or not and the game continues at FIG. 5D. If yes, then the human player has the option of changing the secret word in step 114 or not. If yes, then the game continues in FIG. 5D. If not, then the computer wins and the game is over.

Figure 5D:
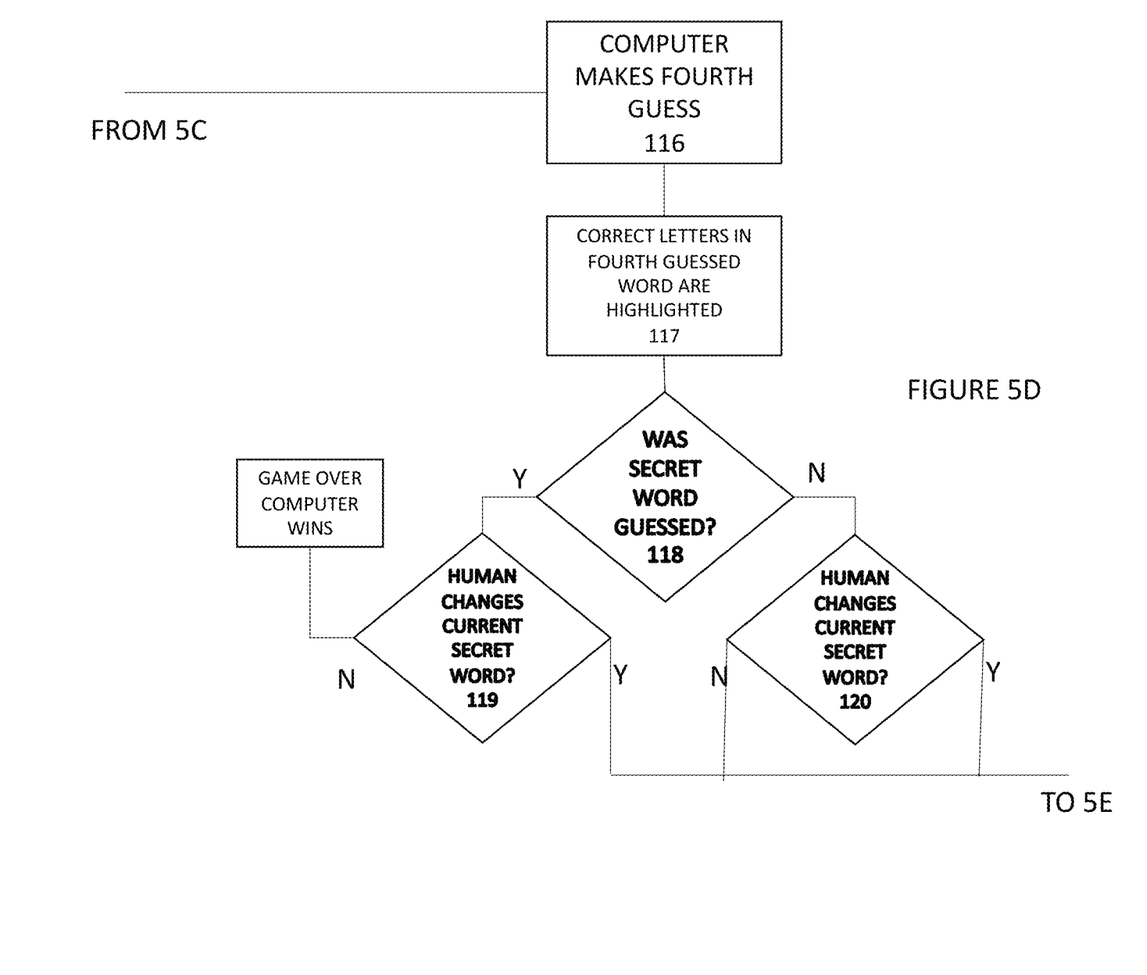

In FIG. 5D, assuming that the computer has not won and the game continues, the computer now makes its fourth guess in step 116. The correct letters in the fourth guessed word are highlighted in step 117. The next step is the yes or no decision step 118, "was the secret word guessed?". If no, then the human player has the option of changing the secret word in step 120 or not and the game continues at FIG. 5E. If yes, then the human player has the option of changing the secret word in step 119 or not. If yes, then the game continues in FIG. 5E. If not, then the computer wins and the game is over.

Figure 5E:
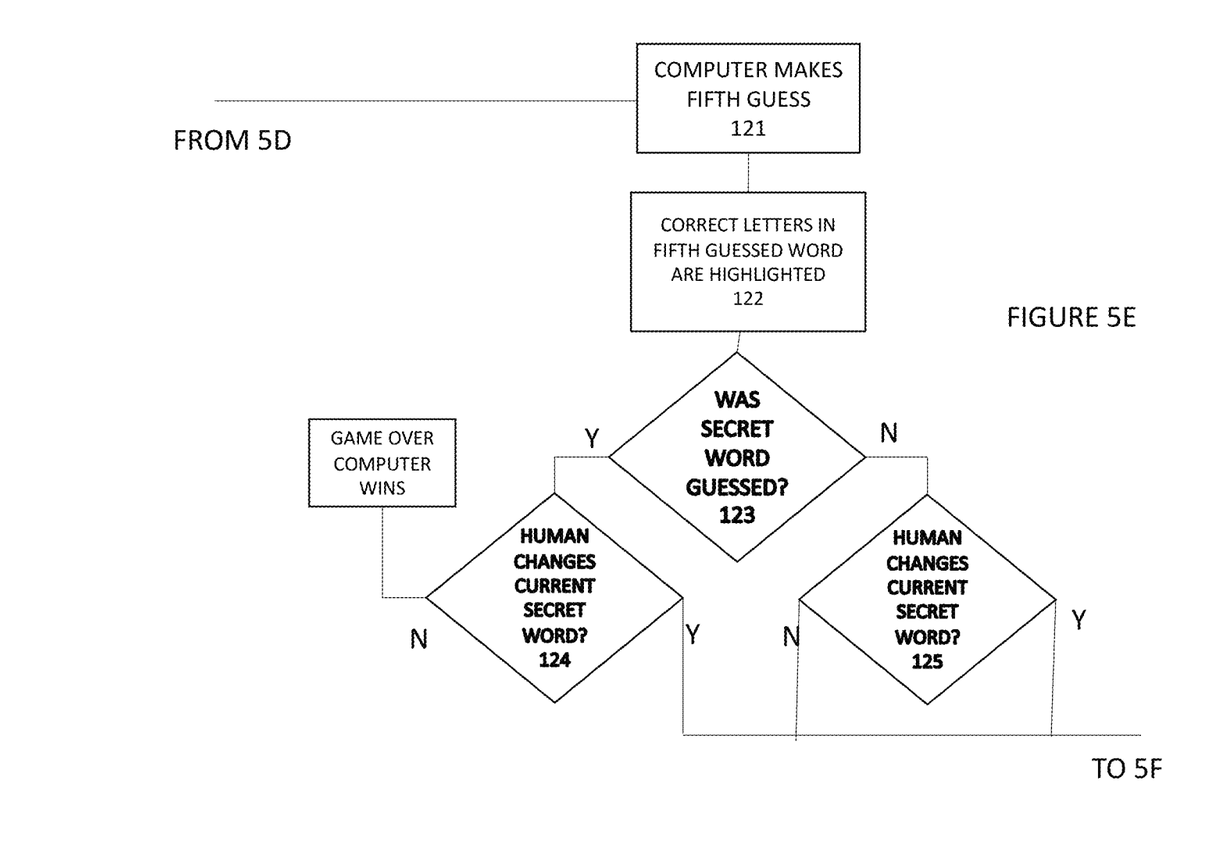

In FIG. 5E, assuming that the computer has not won and the game continues, the computer now makes its fifth guess in step 121. The correct letters in the fifth guessed word are highlighted in step 122. The next step is the yes or no decision step 123, "was the secret word guessed?". If no, then the human player has the option of changing the secret word in step 125 or not and the game continues at FIG. 5F. If yes, then the human player has the option of changing the secret word in step 124 or not. If yes, then the game continues in FIG. 5F. If not, then the computer wins and the game is over.

Figure 5F:
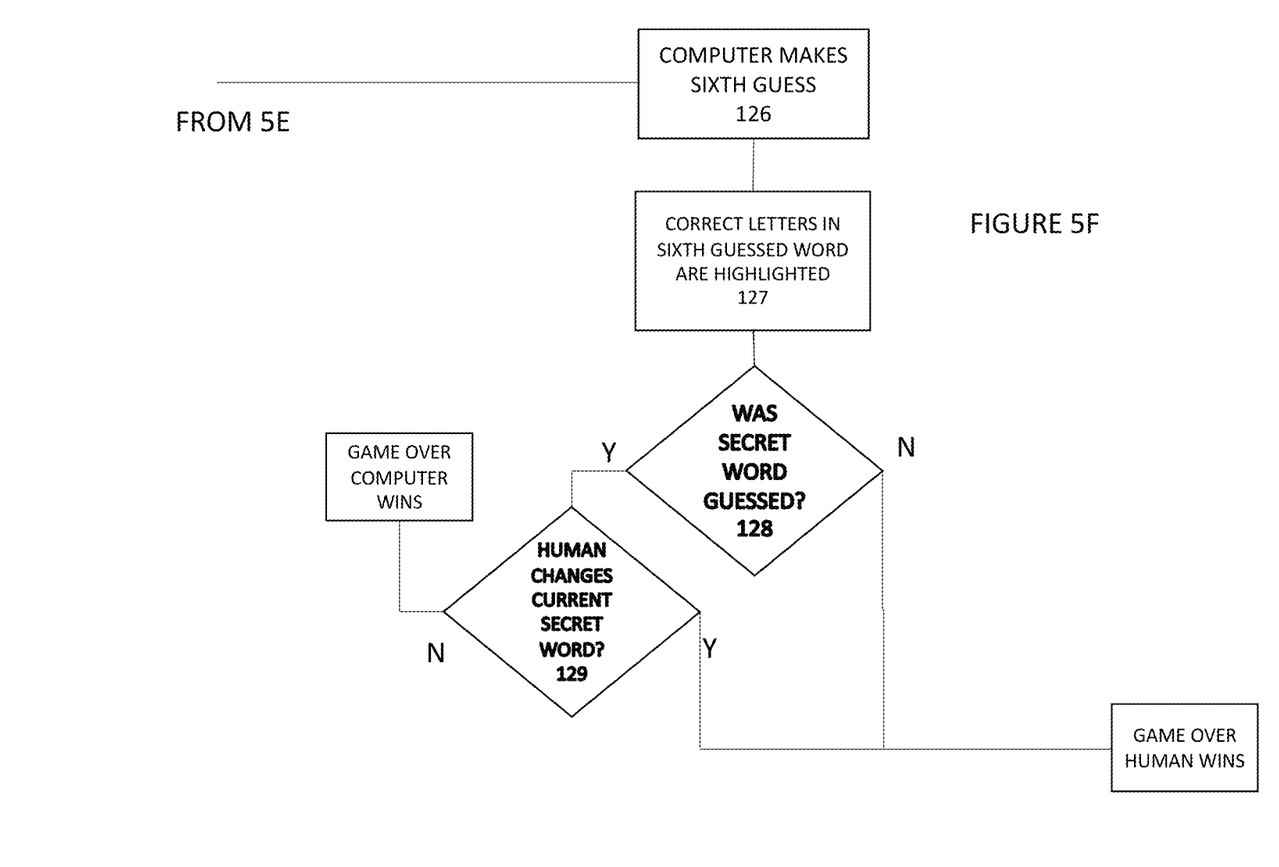

In FIG. 5F, assuming that the computer has not won and the game continues, the computer now makes its sixth guess in step 126. The correct letters in the sixth guessed word are highlighted in step 127. The next step is the yes or no decision step 128, "was the secret word guessed?". If no, then the human player has won and the game is over. If yes, then the human player has the option of changing the secret word in step 129 or not. If yes, then then the human player has won and the game is over. If not, then the computer wins and the game is over. In some embodiments there is an indication of the human winning by flashing text or colors, sounds such as music, tones, a buzzer or a bell, a haptic notification such as a vibration, etc., or a combination of any of the foregoing, perhaps including confetti flying across the screen.

In some embodiments the application maintains a cumulative score for a user with statistics such as the number or wins by the human and by the computer, the average number of guesses required by the computer both for its wins and for its losses, and the average time per game. In some embodiments the application permits some or all of the statistics to be reset to zero. The application along with the internet interface also permits in some embodiments for the human user to share his or her score with friends and/or post results to social media.

The display screen for use with the present invention is preferably an LCD display screen or discrete LED light emitters. Alternatively, the display screen can be an LED or OLED display screen.

A user interface on the display screen of the apparatus is preferably an application program interface (API) such as a local API, web API or program API and, alternatively, can be a network interface controller that connects a computer to a computer network or a virtual network interface connecting a computer to a virtual private network.

Networks used for communication between the human player and the computer are preferably a communications network using one or more commercial communications protocols, such as TCP/IP, FTP, UPnP, NFS, or CIFS. The network can be wireless or wired, including a local area network (LAN), a wide-area network (WAN), a virtual private network (VPN), the internet, an intranet, an extranet, a public switched telephone network (PSTN), a cellular network, a satellite communications network, an infrared network, another type of wireless network, and the like, or a combination of the foregoing.

An example of the present invention can include a database of words formed from a variety of data stores and other memory or storage media. These components can reside in one or more of the servers, as discussed above, or may reside in a network of the servers. Alternatively, the database can be stored locally and maintained on the user's smartphone, tablet, computer, or other storage device. In certain embodiments, the information may reside in a storage-area network (SAN). Similarly, files for performing the functions attributed to the computers, servers or other network devices discussed above may be stored locally and/or remotely, as appropriate. Each computing system described above, including the client devices, may incorporate hardware elements that are electrically coupled via data/control/and power buses. For example, one or more processors in such computing systems may be central processing units (CPU) for one or more of the client devices. The client devices may further include at least one user input device (e.g., a mouse, joystick, keyboard, controller, keypad, or touch-sensitive display screen) and at least one output device (e.g., a display, a printer, a speaker, a haptic device such as a vibrator). Such client devices may also include one or more storage devices, including disk drives, optical storage devices and solid-state storage devices such as a random-access memory (RAM) or a read-only memory (ROM), as well as removable media devices, memory cards, flash cards, storage devices utilizing biological media (e.g., DNA), etc.

The computer systems discussed above also can include computer-readable storage media reader, communications devices (e.g., modems, network cards (wireless or wired), or infrared communication devices) and memory, as previously described. The computer-readable storage media reader is connectable or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements stored within at least one working memory device, including an operating system and application programs such as a client application or web browser. It should be appreciated that alternate embodiments may have numerous variations from that described above. For example, customized hardware also might be used, and/or particular elements might be implemented in hardware, in software (including portable software, such as applets), or in both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage, other magnetic storage devices, or any other medium, including biological media such as DNA, which can be used to store the desired information and which can be accessed by a system device. Based upon the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures and configurations, but the desired features can be implemented using a variety of alternative architectures and configurations. Indeed, it will be apparent to one of skill in the art how alternative functional, logical, or physical partitioning and configurations can be implemented to implement the desired features of the present disclosure. For example, while a single server and a processor are illustrated, the server functions can be distributed over a number of servers and processors. Additionally, with regard to flow diagrams, operational descriptions, and method claims, the order in which the steps are presented herein shall not mandate that the steps of the various embodiments be implemented in the order presented, unless the context dictates otherwise.

Although the disclosure is described above in terms of various example embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosure, whether or not such embodiments are described, and whether or not such features are presented as being a part of a described embodiment. Thus, the breadth and scope of the present disclosure should not be limited by any of the above-described example embodiments, and it will be understood by those skilled in the art that various changes and modifications to the previous descriptions may be made within the scope of the claims.

What is claimed is:

1. An apparatus for playing a word game with two players, comprising: a housing with a display screen and keypad and a processor in the housing programmed for two players to allow the two players to play a word game without connecting to the internet during play of the game and to allow a first player to set a level of difficulty for a second player which is a computer and to allow the first player set a level of guessing ability for the second player and to allow
   a. the first player to select a secret word of a predetermined length by choosing a word from among the words in a predetermined dictionary and which is displayed on the display screen, the secret word to be guessed by the second player within a predetermined number of guesses;
   b. the second player to make a guess of the secret word displayed on the display screen;
   c. a display of the letters in the guessed word on the display screen that are in the secret word by indicating on the guessed word the letters in the guessed word that are in the same positions as are those letters in the secret word and the letters in the guessed word that are in the secret word, but are not in the same positions as are those letters in the secret word and wherein the first player optionally changes the secret word after a guess to a changed secret word which is in the predetermined dictionary and which is consistent with the letter indications already given; and
   d. repeating b. and c. until the more recent of the secret word and the most-recent changed secret word is guessed or the predetermined number of guesses have been made.

2. The apparatus according to claim 1, wherein:
the predetermined length comprises 5 letters;
the predetermined dictionary comprises the Wordle™ dictionary; and
the predetermined number of guesses is 6.

3. The apparatus according to claim 1, wherein:
the predetermined length comprises 5 letters;
the predetermined dictionary comprises the Scrabble® dictionary; and
the predetermined number of guesses is 6.

4. The apparatus according to claim 1, wherein:
the predetermined length comprises 5 letters;
the predetermined dictionary comprises the Merriam-Webster online dictionary; and
the predetermined number of guesses is 6.

5. The apparatus according to claim 1, wherein:
the predetermined length comprises 5 letters;
the predetermined dictionary comprises the Oxford English dictionary; and
the predetermined number of guesses is 6.

6. The apparatus according to claim 1, wherein
the predetermined length comprises 5 letters;
the predetermined dictionary comprises a purpose-built dictionary; and
the predetermined number of guesses is 6.

7. The apparatus according to claim 1, wherein the keypad is a virtual keypad on the display screen.

8. The apparatus according to claim 1, wherein the apparatus is a smartphone capable of connecting to the Internet.

9. The apparatus according to claim 1, wherein the apparatus is a tablet capable of connecting to the Internet.

10. The apparatus according to claim 1, wherein the apparatus is a purpose-built device capable of connecting to the Internet.

11. The apparatus according to claim 1, wherein the level of difficulty of the second player includes every letter identified as being in the correct location must be used in that location in all subsequent guesses.

12. The apparatus according to claim 11, wherein the level of difficulty of the second player further includes every letter identified as being in the wrong location must be used in all subsequent guesses.

13. The apparatus according to claim 12, wherein the level of difficulty of the second player further includes no letter identified as being in the wrong location may be used in that same wrong location in a subsequent guess.

14. The apparatus according to claim 1, wherein the level of guessing ability of the second player includes every guess is randomly chosen from the predetermined dictionary and is consistent with the letter indications already given.

15. The apparatus according to claim 11, wherein the level of guessing ability of the second player includes every guess is randomly chosen from the predetermined dictionary and is consistent with the letter indications already given.

16. The apparatus according to claim 12, wherein the level of guessing ability of the second player includes every guess is randomly chosen from the predetermined dictionary and is consistent with the letter indications already given.

17. The apparatus according to claim 13, wherein the level of guessing ability of the second player includes every guess is randomly chosen from the predetermined dictionary and is consistent with the letter indications already given.

18. The apparatus according to claim 1, wherein the level of guessing ability of the second player includes guesses using information about the first player gained from previous games.

19. The apparatus according to claim 11, wherein the level of guessing ability of the second player includes guesses using information about the first player gained from previous games.

20. The apparatus according to claim 12, wherein the level of guessing ability of the second player includes guesses using information about the first player gained from previous games.

21. The apparatus according to claim 13, wherein the level of guessing ability of the second player includes guesses using information about the first player gained from previous games.

22. The apparatus according to claim 1, wherein the level of guessing ability of the second player includes using machine learning and/or artificial intelligence (AI).

23. The apparatus according to claim 11, wherein the level of guessing ability of the second player includes using machine learning and/or artificial intelligence (AI).

24. The apparatus according to claim 12, wherein the level of guessing ability of the second player includes using machine learning and/or artificial intelligence (AI).

25. The apparatus according to claim 13, wherein the level of guessing ability of the second player includes using machine learning and/or artificial intelligence (AI).

26. The apparatus according to claim 1, wherein updates to the program are made over a connection to the Internet.

27. The apparatus according to claim 8, wherein updates to the program are made over a connection to the Internet.

28. The apparatus according to claim 9, wherein updates to the program are made over a connection to the Internet.

29. The apparatus according to claim 10, wherein updates to the program are made over a connection to the Internet.

30. The apparatus according to claim 1, wherein updates to the program are made by direct connection to a data storage device.

\* \* \* \* \*